United States Patent
Okada (10) Patent No.: US 8,260,197 B2
(45) Date of Patent: Sep. 4, 2012

(54) RADIO REPEATING SYSTEM, RADIO REPEATING APPARATUS, RADIO TERMINAL OPERATING METHOD AND RADIO REPEATING METHOD

(75) Inventor: Shinji Okada, Norcross, GA (US)

(73) Assignee: Kabushiki Kaisha Kenwood, Hachiouji-Shi, Tokyo (JP)

( * ) Notice: Subject to any disclaimer, the term of this patent is extended or adjusted under 35 U.S.C. 154(b) by 204 days.

(21) Appl. No.: 12/658,568

(22) Filed: Feb. 11, 2010

(65) Prior Publication Data
US 2011/0195660 A1 Aug. 11, 2011

(51) Int. Cl.
*H04B 7/00* (2006.01)
*H04B 7/15* (2006.01)
*H04B 7/185* (2006.01)
*H04M 1/00* (2006.01)
*H04W 24/00* (2009.01)

(52) U.S. Cl. .......... 455/18; 455/517; 455/518; 455/519; 455/11.1; 455/13.1; 455/575.3; 455/456.1

(58) Field of Classification Search ................ 455/11.1, 455/13.1, 517–519, 7
See application file for complete search history.

(56) References Cited

U.S. PATENT DOCUMENTS

| | | | | |
|---|---|---|---|---|
| 6,169,880 | B1 * | 1/2001 | La Fratta et al. | 455/11.1 |
| 7,031,273 | B2 * | 4/2006 | Shores et al. | 370/320 |
| 7,286,841 | B2 * | 10/2007 | Sun et al. | 455/502 |
| 2006/0009248 | A1 * | 1/2006 | Sakamoto et al. | 455/517 |
| 2008/0096577 | A1 * | 4/2008 | Attali et al. | 455/456.1 |
| 2008/0102877 | A1 * | 5/2008 | Suemitsu et al. | 455/522 |
| 2009/0291703 | A1 * | 11/2009 | Wang | 455/518 |

FOREIGN PATENT DOCUMENTS

JP 2007-174021 5/2007

* cited by examiner

*Primary Examiner* — Bobbak Safaipour
(74) *Attorney, Agent, or Firm* — Renner, Kenner, Greive, Bobak, Taylor & Weber (57) ABSTRACT

A radio repeating system has first and second radio terminals, a radio repeater to receive a signal transmitted from the first radio terminal and transmit the signal to the second radio terminal, and a controller to control the radio repeater. The controller has a terminal signal determiner to detect a signal from the first radio terminal to determine whether the first radio terminal is in a transmission halt mode or a transmission mode, a first counter to start counting when a result of detection is the transmission halt mode, and a second counter to start counting when a result of detection is the transmission mode. The controller halts a wireless relay operation of the radio repeater when the result of detection is the transmission halt mode while the second timer is operating, or when the first timer finishes counting.

6 Claims, 6 Drawing Sheets

RADIO REPEATING SYSTEM, RADIO REPEATING APPARATUS, RADIO TERMINAL OPERATING METHOD AND RADIO REPEATING METHOD

BACKGROUND OF THE INVENTION

The present invention relates to a radio repeating system, a radio repeating apparatus, a radio terminal operating method, and a radio repeating method.

A radio repeating system is known in which a pair of radio terminals communicate with each other under a relay operation by a radio repeating apparatus. The radio repeating apparatus is implemented with a timer function for keeping a relay transmission mode for a predetermined time and allowing occupation of a channel used at present when the radio terminals finish transmission.

A time during which a timer function allows channel occupation is referred to as a hold time.

Even if a pair of radio terminals finish communications, the radio repeating apparatus occupies the channel because the apparatus continues a relay transmission operation, which leads to a problem in that other radio terminals cannot use the radio repeating apparatus.

A scheme to solve this problem is a method in which an end key implemented in a radio terminal is operated to transmit an end command to finish the hold time and release an occupied channel.

The configuration with the end key described above forces a radio terminal to have a specific function, thus raising a cost. Moreover, it is complex and time consuming because operations such as recognizing and pushing the end key are required.

SUMMARY OF THE INVENTION

In view of the foregoing problems, it is a purpose of the present invention to provide a radio repeating system, a radio repeating apparatus, a radio terminal operating method, and a radio repeating method to finish a hold time with no particular function to be implemented in a radio terminal.

The present invention provides a radio repeating system comprising: a first radio terminal for transmission, having a half-duplex communication function; a second radio terminal for reception, having a half-duplex communication function; a radio repeater to receive a signal transmitted from the first radio terminal and transmit the signal to the second radio terminal by relay transmission; and a controller to control the radio repeater, wherein the controller includes: a terminal signal determiner to detect a signal from the first radio terminal to determine whether the first radio terminal is in a transmission halt mode or a transmission mode; a first counter to start counting when the terminal signal determiner determines that the first radio terminal is in the transmission halt mode and continue counting a predetermined first time; and a second counter to start counting when the terminal signal determiner determines that the first radio terminal is in the transmission mode and continue counting a predetermined second time, wherein the controller halts a radio relay operation of the radio repeater when the terminal signal determiner determines that the first radio terminal is in the transmission halt mode while the second timer is operating, or when the first timer finishes counting of the first time.

Moreover, the present invention provides a radio repeating apparatus comprising: a radio repeater to receive a signal transmitted from a radio terminal and transmit the signal by relay transmission; a terminal signal determiner to detect a signal from the radio terminal to determine whether the radio terminal is in a transmission mode or a transmission halt mode; a first counter to start counting when the terminal signal determiner determines that the radio terminal is in the transmission halt mode and continue counting a predetermined first time; and a second counter to start counting when the terminal signal determiner determines that the radio terminal is in the transmission halt mode and continue counting a predetermined second time; and a controller to halt a radio relay operation of the radio repeater when the terminal signal determiner determines that the radio terminal is in the transmission halt mode while the second timer is operating, or when the first timer finishes counting of the first time.

Furthermore, the present invention provides a method of operating a radio terminal equipped with a push-to-talk switch that switches operations between a transmission mode by depressing and a transmission halt mode by releasing, the radio terminal performing communications via a radio repeating apparatus that continues a relay operation for a predetermined time when a signal from the radio terminal is halted, the method comprising the steps of: releasing the push-to-talk switch of the radio terminal in the transmission mode to halt transmission to the radio repeating apparatus; depressing the push-to-talk switch while the radio repeating apparatus continues the relay operation to put the radio terminal in the transmission mode; and releasing the push-to-talk switch before a predetermined time to put the radio terminal in the transmission halt mode, thus finishing the relay operation of the radio repeating apparatus.

Still, furthermore, the present invention provides a radio repeating method comprising the steps of: a step of relaying half-duplex communications, by a radio repeating apparatus, between a plurality of radio terminals; a first detecting step of detecting a transmission signal, by the radio repeating apparatus, from any of the radio terminals; a first determining step of determining whether the transmission signal is in a transmission halt mode or a transmission mode, based on a first result of detection in the first detecting step; a first start step of starting counting at a first timer while the radio repeating apparatus continues a relay operation when it is determined, in the first determining step, that the transmission signal is in the transmission halt mode; a second detecting step of detecting a transmission signal from any of the radio terminals while the first timer is counting; a second determining step of determining whether the transmission signal is in the transmission halt mode or the transmission mode, based on a second result of detection in the second detecting step; a second start step of starting counting at a second timer whereas resetting the first timer while the radio repeating apparatus continues a relay operation when it is determined, in the second determining step, that the transmission signal is in the transmission mode before the first timer finishes counting; a third detecting step of detecting a transmission signal from any of the radio terminals before the second timer finishes counting; a third determining step of determining whether the transmission signal is in the transmission halt mode or the transmission mode, based on a third result of detection in the third detecting step; and halting a relay operation of the radio repeating apparatus when it is determined, in the third determining step, that the transmission signal is in the transmission halt mode before the second timer finishes operating, or when the first timer finishes counting.

DETAILED DESCRIPTION OF PREFERRED EMBODIMENTS

A radio repeating system, a radio repeating apparatus, a radio terminal operating method, and a radio repeating method according to the present invention will be described with reference to the attached drawings. The structural elements, type, combination, shape, and their relative positioning described in the embodiments are merely examples, without limiting the scope of the present invention, as far as there is no particular description.

Figure 1:
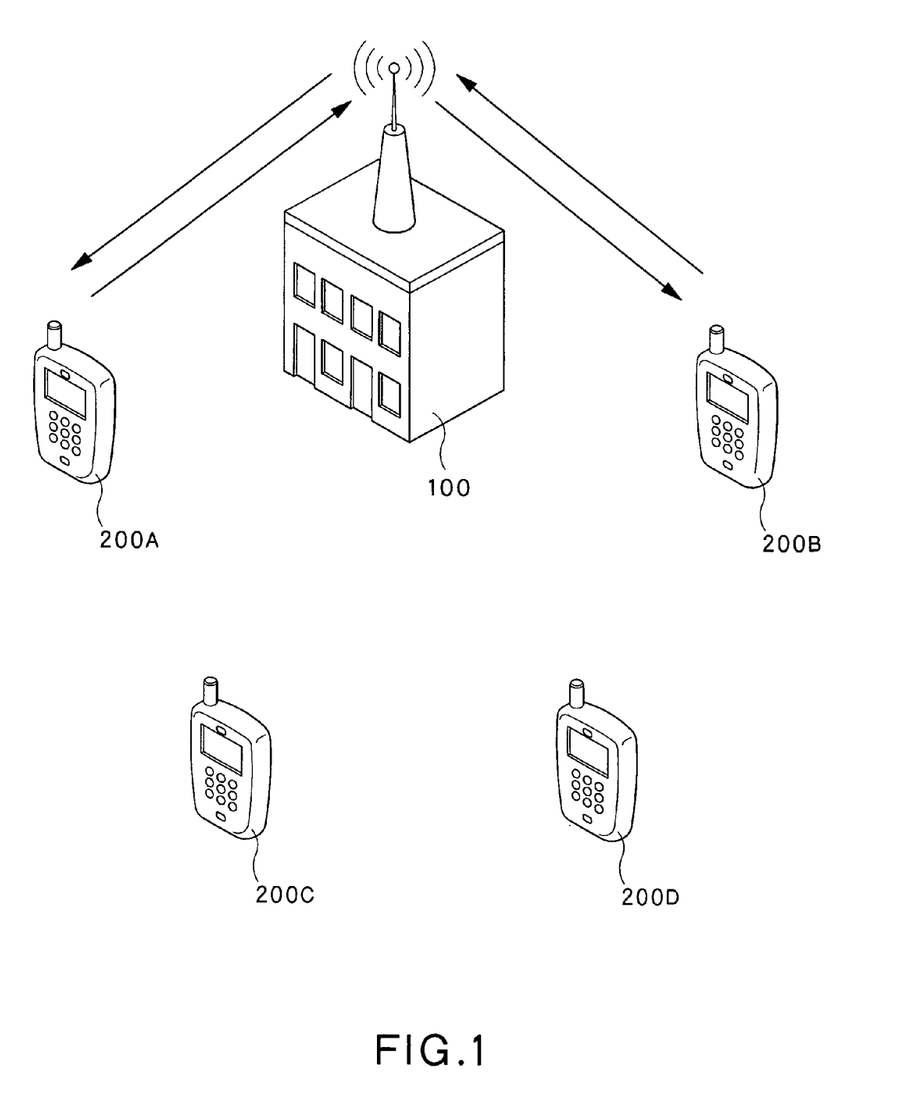
FIG. 1 is an outline view of a radio repeating system according to an embodiment of the present invention.

FIG. 1 is an outline view of a radio repeating system according to an embodiment of the present invention.

In FIG. 1, radio terminals 200A to 200D are half-duplex radio apparatuses, the transmission being conducted by user operations. The radio terminals 200A to 200D may be referred to as a radio terminal 200 as a generic name if necessary.

A radio repeating apparatus 100 receives a signal transmitted by the radio terminal 200A and transmits the signal to the radio terminal 200B, a communications company, by relaying the signal. Since the radio terminals 200A and 200B can interactively communicate with each other, the radio repeating apparatus 100 receives a signal transmitted from the radio terminal 200B and transmits the signal to the radio terminal 200A, a communications company, by relaying the signal.

The radio terminals 200C and 200D are waiting until the radio terminals 200A and 200B finish communications relayed by the radio repeating apparatus 100.

Figure 2:
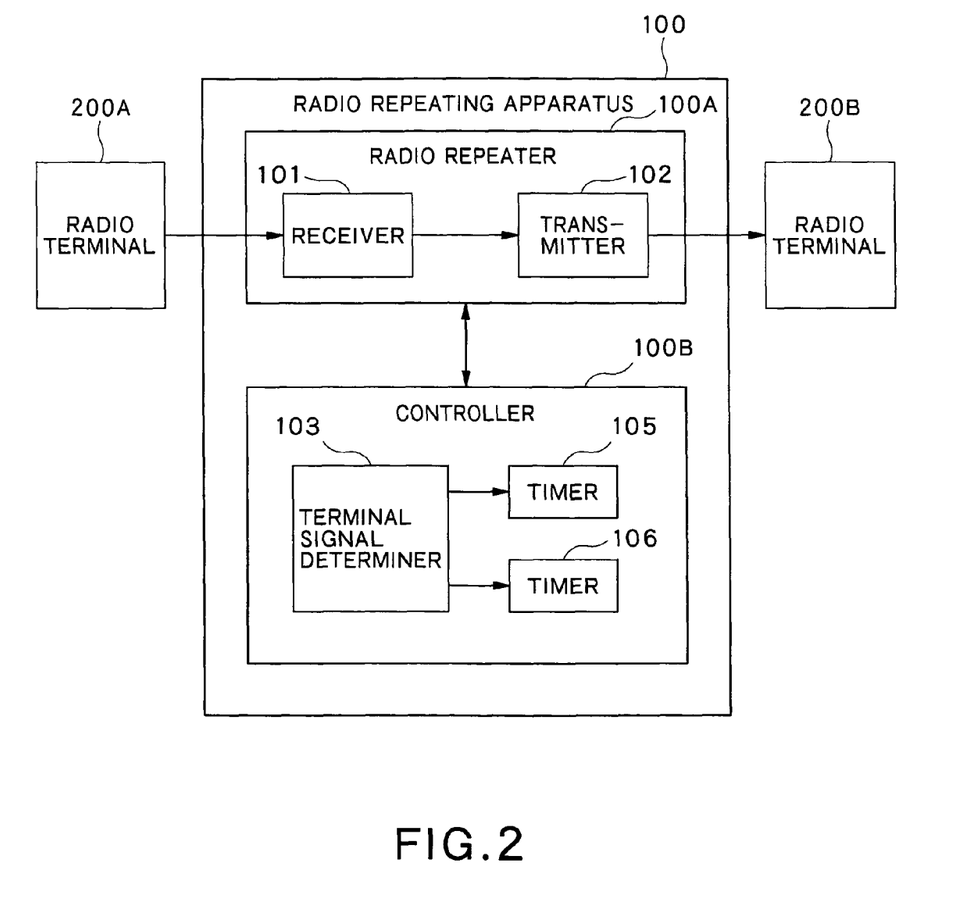
FIG. 2 is a block diagram of a configuration of a radio repeating system according to an embodiment of the present invention.

FIG. 2 is a block diagram of a configuration of a radio repeating system according to an embodiment of the present invention.

FIG. 2 shows only the radio repeating apparatus 100 and the radio terminals 200A and 200B communicating with each other via the radio repeating apparatus 100. Moreover, FIG. 2 shows that the radio terminal 200A is in a transmission mode while the radio terminal 200B is in a reception mode.

The radio repeating apparatus 100 is provided with a radio repeater 100A and a controller 100B. The radio repeater 100A is provided with a receiver 101 and a transmitter 102. The controller 100B is provided with a terminal signal determiner 103 and timers 105 and 106.

Figure 3:
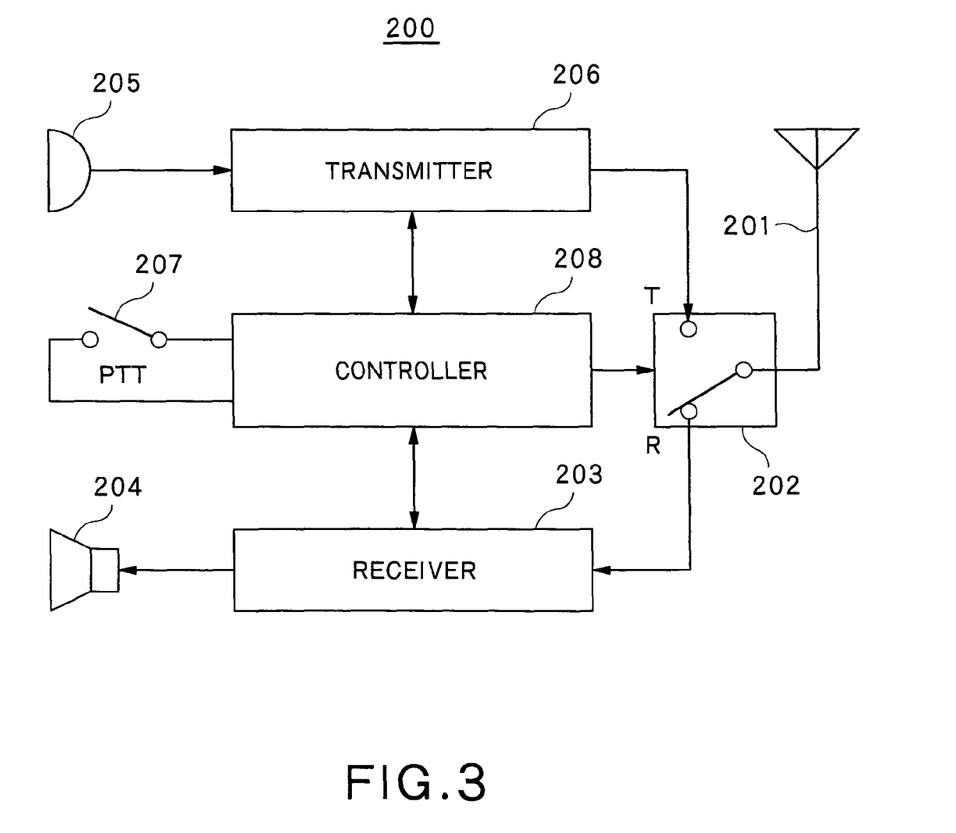
FIG. 3 is an exemplary block diagram of a configuration of a radio terminal according to the present invention.

FIG. 3 is a block diagram of a configuration of the radio terminal 200.

The radio terminal 200 is constituted by an antenna 201, antenna switch 202, a receiver 203, a speaker 204; a microphone 205, a transmitter 206, a push-to-talk (PTT) switch 207 (abbreviated to PTT 207, hereinafter), and a controller 208.

An operation of the radio terminal 200 is described with reference to FIG. 3.

The antenna 201 receives a signal from the radio repeating apparatus 100. The antenna switch 202 is turned to an R side when reception, to send the received signal received by the antenna 201 to the receiver 203 whereas to a T side when transmission, to send a transmission signal from the transmitter 206 to the antenna 201. The switching is performed by the controller 208.

The receiver 203 amplifies the received signal, reduces disturbance components, detects the received signal, demodulates the detected signal, and converts the demodulated signal into an audio signal. The audio signal is fed to the speaker 204. The speaker 204 outputs audio.

The microphone 205 converts voices of a user into an audio signal and inputs the audio signal to the transmitter 206. The transmitter 206 modulates the audio signal into a modulated wave, amplifies the modulated wave, and eliminates spurious components, thus converting the modulated wave into a transmission signal. The transmission signal is output from the antenna 201 via the antenna switch 202.

The radio terminal 200 is put in the transmission mode when the PTT 207 is depressed (turned on) whereas in the reception mode when the PTT 207 is released (turned off)

While the PTT 207 is being off, the controller 208 supplies power from a power supply (not shown) to the receiver 203 and sets several data necessary for reception in the receiver 203. In contrast, while the PTT 207 is being on, the controller 208 supplies power from a power supply (not shown) to the transmitter 206 and sets several data necessary for transmission in the transmitter 206.

The radio terminal 200 is put in the reception mode while the PTT 207 is being off and a signal is being transmitted from the radio repeating apparatus 100. In contrast, when there is no signal from the radio repeating apparatus 100 or a control signal from the radio repeating apparatus 100 is not for the radio terminal 200, the radio terminal 200 is put in a standby mode and the controller 208 controls the receiver 203 to mute audio output from the speaker 204.

Figure 4:
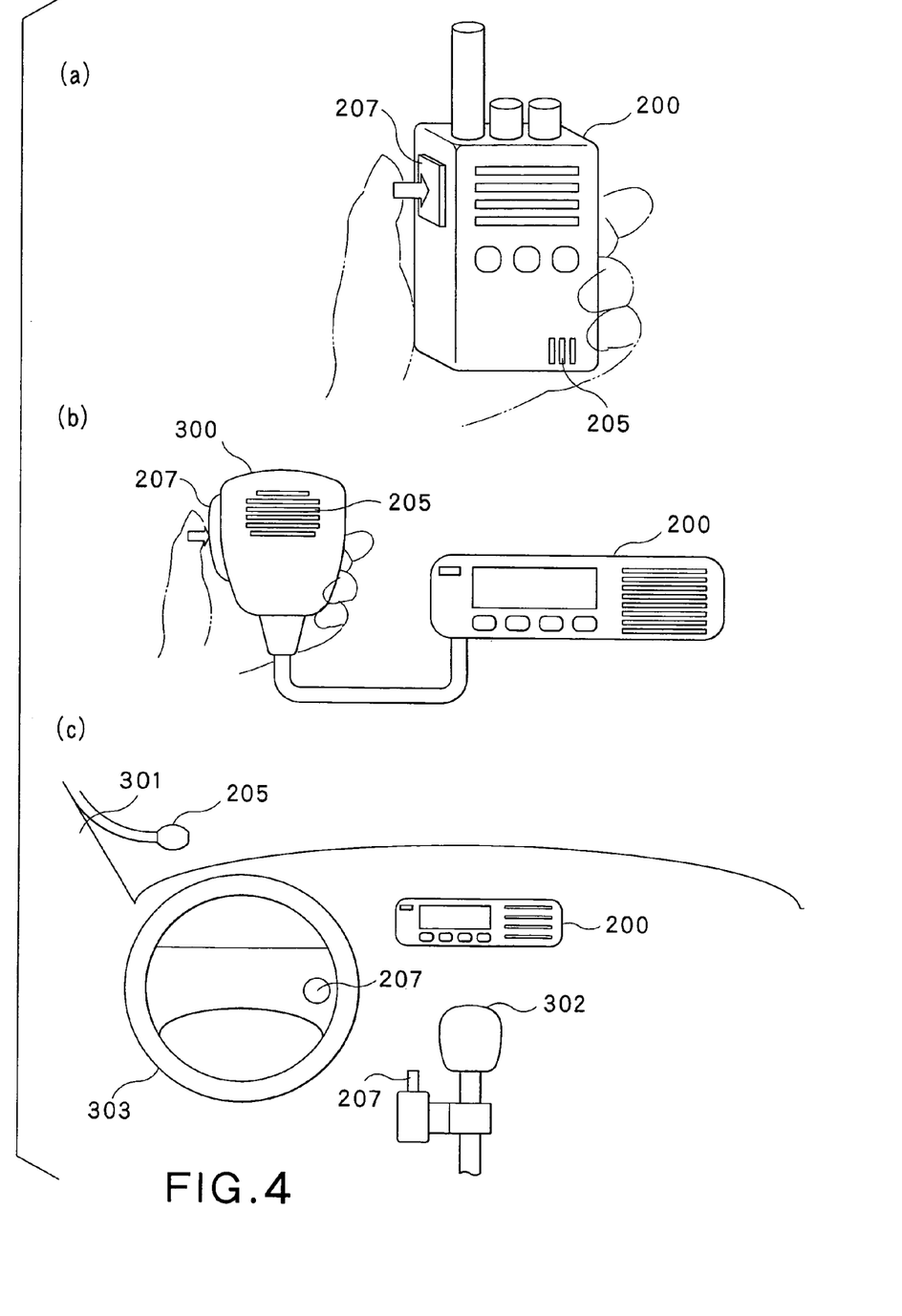
FIG. 4 is a view showing locations at which a push-to-talk switch of a radio terminal according to the present invention is installed.

When the radio terminal 200 is a portable device, as shown in (a) of FIG. 4, the PTT 207 is mostly attached to the side face of the body for easy one-hand operation. When the radio terminal 200 is an mobile device, as shown in (b) of FIG. 4, the PTT 207 is attached to the side face of a hand microphone 300 or, as shown in (c) of FIG. 4, the PTT 207 is provided in a specific location, for example, fixed to a pillar 301 so that an operation of a shift lever 302, a staring wheel 303, etc., is easily made during driving.

An operation of the radio repeating apparatus 100 is described with reference to FIG. 2 in the case where the radio repeating apparatus 100 receives a signal transmitted from the radio terminal 200A and transmits it to the radio terminal 200B.

In FIG. 2, the receiver 101 receives a transmission signal of the radio terminal 200A. The receiver 101 reduces components of a received signal, detects the received signal, and demodulates the detected signal to obtain an audio data signal and a control data signal. The audio data signal is input to the transmitter 102 whereas the control data signal is input to the controller 100B.

The controller 100B analyzes the demodulated control data signal, constructs a control data signal necessary for communications with the radio terminal 200B, and sends the control data signal to the transmitter 102.

The transmitter 102 modulates the control data signal necessary for communications with the radio terminal 200Ba and the demodulated audio data signal to convert them into a transmission signal, amplifies the transmission signal, reduces disturbance components, and transmits the amplified signal to the radio terminal 200B.

The controller 100B analyzes information included in the received control data signal, such as ID information indicating the type of the radio terminals 200A and 200B, to construct data on relay transmission and perform control necessary for operations of the receiver 101 and transmitter 102.

The terminal signal determiner 103 determines whether the radio terminal 200A is in a transmission halt mode or a transmission mode depending on whether there is a synchronizing signal from the radio terminal 200A. The determination may be performed with detection of field strength, bit error, etc., besides synchronizing signal, thus not limited.

When the terminal signal determiner 103 determines that the radio terminal 200A halts transmission, the controller 100B instructs the timer 105 to start counting a predetermined time. On the other hand, when the terminal signal determiner 103 determines that the radio terminal 200 performs transmission, the controller 100B instructs the timer 106 to start counting a predetermined time. Since the timer 106 starts counting when transmission from the radio terminal 200A is received, it may count the number of synchronizing signals used for determination at the terminal signal determiner 103.

The controller 100B controls the radio repeater 100A while the timer 105 is counting so that the radio repeater 100A continues a relay operation even if there is no signal from the radio terminals 200A.

When the timer 105 finishes counting, the controller 100B halts the relay transmission operation of the radio repeater 100A. The duration from the count start to end at the timer 105 is a hold time.

When an embodiment of radio repeating system is achieved to be a digital system, relay transmission is in a no modulation mode during the hold time. Nevertheless, a synchronizing signal such as a sync word is transmitted.

Figure 5:
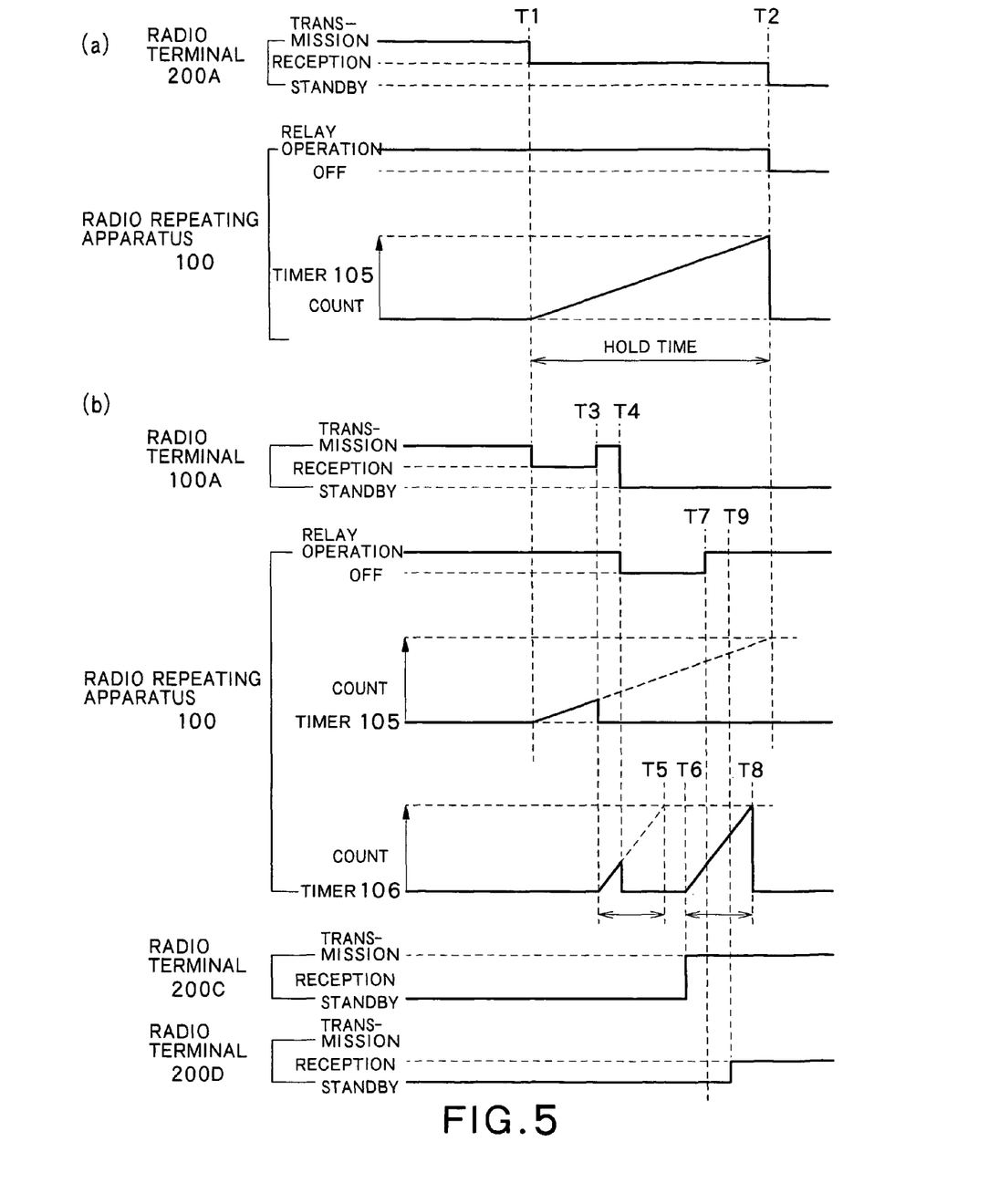
FIG. 5 is a view showing time charts for explaining operations of a radio terminal according to an embodiment of the present invention.

An operation of the controller 100B is described with reference to FIG. 5. Shown in (a) of FIG. 5 is a time chart for the case where the hold time is complete. Shown in (b) of FIG. 5 is a time chart for the case where the hold time is cancelled by an operation at the radio terminal 200A.

In (a) of FIG. 5, a user of the radio terminal 200A turns off the PTT 207 at a timing T1 to finish the transmission and keeps a reception mode.

When the transmission from the radio terminal 200A is halted, the timer 105 starts counting and then the radio repeating apparatus 100 keeps a relay transmission mode for a duration (the hold time) from the timing T1 to a predetermined timing T2.

The radio repeating apparatus 100 finishes a relay transmission operation if the hold time (T1-T2) elapses with no response from the radio terminal 200B or no resumption of transmission by the radio terminal 200A. The radio terminals 200A and 200B are released from the reception mode and put in a standby mode due to the halt of a signal from the radio repeating apparatus 100.

In (b) of FIG. 5, the user of the radio terminal 200A turns off the PTT 207 at the timing T1 to finish the transmission and keeps a reception mode.

The timer 105 starts counting when the transmission from the radio terminal 200A is halted.

The user depresses the PTT 207 for a very short period and releases it at timings T3 to T4 for a normal transmission operation. The operation of the PTT 207 for such a short period is referred to as one-push.

When the radio terminal 200A is put in a transmission mode at the timing T3 before the timing T2 at which the hold time is complete, since it is still the hold time, the radio repeating apparatus 100 halts and resets the timer 105 and instructs the timer 106 to start counting.

Either of halt and resetting of the timer 105 and count start of the timer 106 may be performed first or both may be performed at the same time.

The timer 106 finishes counting at a timing T5. However, if the radio terminal 200A finishes transmission at the timing T4 before the completion of counting, the radio repeating apparatus 100 halts and resets the timer 106 and finishes a relay transmission operation.

The radio terminals 200C and 200D have been in a communication standby mode because the radio repeating apparatus 100 has been in use. However, since the relay transmission operation is complete for the communications between the radio terminals 200A and 200B, the radio terminal 200C is allowed to start transmission at a timing T6 without waiting for the timing T2 for completion of the hold time.

The radio repeating apparatus 100 starts a relay transmission at a timing T7.

The radio terminal 200D receives the relay transmission from the radio repeating apparatus 100 and confirms whether it is the communication to itself, and when it is confirmed, releases muting at a timing T9 to reproduce received audio.

Figure 6:
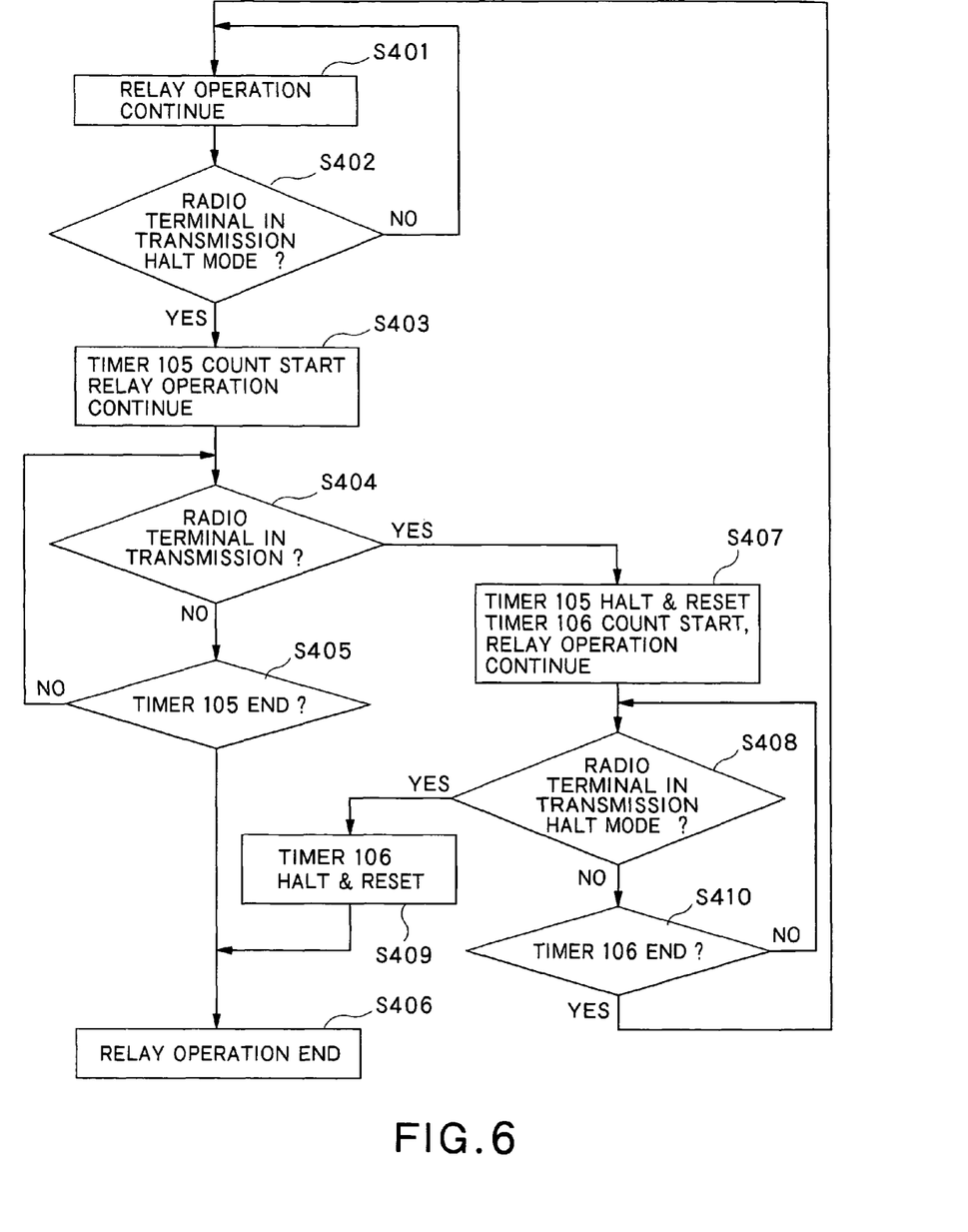
FIG. 6 shows a flowchart for explaining operations of a radio repeating system according to an embodiment of the present invention.

FIG. 6 shows a flowchart for the control in the radio repeating apparatus 100, that is an embodiment of a radio repeating method.

The radio terminals 200A and 200B are communicating each other via the radio repeating apparatus 100 and the receiver 101 of the radio repeater 100A is receiving a transmission signal from the radio terminal 200A (step S401).

The controller 100B detects a synchronizing signal in a received signal and the terminal signal determiner 103 determines, based on a result of the detection, whether the radio terminal 200A comes in a transmission halt mode or remains in a transmission mode, and when it is determined that the radio terminal 200A comes in the transmission halt mode (YES in step S402), instructs the timer 105 to start counting, thus continuing a relay operation (step S403). Even while the timer 105 is counting, the terminal signal determiner 103 continues detection of a transmission signal from the radio terminal 200A or 200B (step S404).

When no transmission signal is detected from the radio terminal 200A or 200B (NO in step S404) and when the timer 105 finishes counting (YES in step S405), the controller 100B of the radio repeating apparatus 100 determines that the communication is complete and then the radio repeating apparatus 100 finishes the relay operation (step S406). When counting at the timer 105 is not complete yet (NO in step S405), the process returns to step S404 in which the terminal signal determiner 103 continues detection of signals.

When a transmission signal from the radio terminal 200A or 200B is received before the timer 105 finishes counting (YES in step S404), the controller 100B halts and resets the timer 105, and instructs the timer 106 to start counting (step S407). The controller 100B may halt and reset the timer 105 before instructing the timer 106 to start counting or vise versa, or simultaneously.

When a signal from the radio terminal 200A or 200B is halted while the timer 106 is counting (YES in step S408), the controller 100B halts and resets the timer 106 (step S409), and then finishes the relay operation (step S406).

When a signal from the radio terminal 200A or 200B is not halted (NO in step S408), the controller 100B determines whether the timer 106 finishes counting (step S410).

When the timer 106 is counting (NO in step S410), the radio repeater 100A continues the relay operation and the terminal signal determiner 103 of the controller 100B continues detection of signals from the radio terminal 200A or 200B (step S408).

On the contrary, when the timer 106 finishes counting (YES in step 410) while a signal from the radio terminal 200A or 200B is not halted (NO in step S408), the controller 100B determines that the radio terminals 200A and 200B continue communications and thus continues the relay operation (step S401).

As described in detail, the relay operation at the radio repeating apparatus 100 can be released during the hold time by one-pushing the PTT 207 with no transmission or operation of specific commands at the radio terminals 200A and 200B.

The function of releasing the hold time described above can be achieved with modifications to the software of the controller 100B of the radio repeating apparatus 100, namely, the function of releasing the hold time can be achieved with a currently used radio terminal with no necessity of preparing a new radio terminal implemented with an end key.

With the function of releasing the hold time described above, a user of the radio terminal 200 can halt the relay operation of the radio repeating apparatus 100 to release a channel currently in use, thus shortening the time occupying the channel, by one-pushing the PTT 207 at the completion of communications.

Therefore, when the hold time is not necessary, it is released from the radio terminal 200, thus achieving higher use efficiency for the radio repeating apparatus 100.

The controller 100B may be provided outside the radio repeating apparatus 100. Moreover, any of the terminal signal determiner 103 and the timers 105 and 106 may be provided outside the controller 100B.

As described above in detail, the hold time of the radio repeating apparatus can be halted with no particular function implemented at the radio terminal or particular operation thereof, according to the present invention.

What is claimed is:

1. A radio repeating system comprising:
a first radio terminal for transmission, having a half-duplex communication function;
a second radio terminal for reception, having a half-duplex communication function;
a radio repeater to receive a signal transmitted from the first radio terminal and transmit the signal to the second radio terminal by relay transmission; and
a controller to control the radio repeater,
wherein the controller includes:
a terminal signal determiner to detect a signal from the first radio terminal to determine whether the first radio terminal is in a transmission halt mode or a transmission performing mode;
a first counter to start counting when the terminal signal determiner determines that the first radio terminal is in the transmission halt mode and continue counting a predetermined first time; and
a second counter to start counting when the terminal signal determiner determines that the first radio terminal is in the transmission performing mode and continue counting a predetermined second time,
wherein the controller halts a wireless relay operation of the radio repeater when the terminal signal determiner determines that the first radio terminal is in the transmission halt mode while the second timer is operating, or when the first timer finishes counting of the first time.

2. The radio repeating system according to claim 1, wherein the controller halts and resets the first timer when the terminal signal determiner determines that the first radio terminal is in the transmission performing mode while the first timer is operating.

3. A radio repeating apparatus comprising:
a radio repeater to receive a signal transmitted from a radio terminal and transmit the signal by relay transmission;
a terminal signal determiner to detect a signal from the radio terminal to determine whether the radio terminal is in a transmission mode or a transmission halt mode;
a first counter to start counting when the terminal signal determiner determines that the radio terminal is in the transmission halt mode and continue counting a predetermined first time; and
a second counter to start counting when the terminal signal determiner determines that the radio terminal is in the transmission performing mode and continue counting a predetermined second time; and
a controller to halt a wireless relay operation of the radio repeater when the terminal signal determiner determines that the radio terminal is in the transmission halt mode while the second timer is operating, or when the first timer finishes counting of the first time.

4. The radio repeating apparatus according to claim 3, wherein the controller halts and resets the first timer when the terminal signal determiner determines that the radio terminal is in the transmission performing mode while the first timer is operating.

5. A radio repeating method comprising the steps of:
a step of relaying half-duplex communications, by a radio repeating apparatus, between a plurality of radio terminals;
a first detecting step of detecting a transmission signal, by the radio repeating apparatus, from any of the radio terminals;
a first determining step of determining whether the transmission signal is in a transmission halt mode or a transmission performing mode, based on a first result of detection in the first detecting step;
a first start step of starting counting at a first timer while the radio repeating apparatus continues a relay operation when it is determined, in the first determining step, that the transmission signal is in the transmission halt mode;
a second detecting step of detecting a transmission signal from any of the radio terminals while the first timer is counting;
a second determining step of determining whether the transmission signal is in the transmission halt mode or the transmission performing mode, based on a second result of detection in the second detecting step;
a second start step of starting counting at a second timer whereas resetting the first timer while the radio repeating apparatus continues a relay operation when it is determined, in the second determining step, that the transmission signal is in the transmission performing mode before the first timer finishes counting;
a third detecting step of detecting a transmission signal from any of the radio terminals before the second timer finishes counting;
a third determining step of determining whether the transmission signal is in the transmission halt mode or the transmission performing mode, based on a third result of detection in the third detecting step; and
halting a relay operation of the radio repeating apparatus when it is determined, in the third determining step, that the transmission signal is in the transmission halt mode before the second timer finishes operating, or when the first timer finishes counting.

6. The radio repeating method according to claim 5 further comprising the step of continuing a relay operation of the radio repeating apparatus when the second timer finishes counting.

* * * * *

UNITED STATES PATENT AND TRADEMARK OFFICE
CERTIFICATE OF CORRECTION

PATENT NO. : 8,260,197 B2
APPLICATION NO. : 12/658568
DATED : September 4, 2012
INVENTOR(S) : Shinji Okada It is certified that error appears in the above-identified patent and that said Letters Patent is hereby corrected as shown below:

Column 7, line 61:
- the word "timer" should be replaced with the word "counter"

Column 7, line 62:
- the word "timer" should be replaced with the word "counter"

Column 7, line 67:
- the word "timer" should be replaced with the word "counter"

Column 8, line 6:
- after "in a transmission" – add the word "performing"

Column 8, line 17:
- the word "timer" should be replaced with the word "counter"

Column 8, line 18:
- the word "timer" should be replaced with the word "counter"

Column 8, line 22:
- the word "timer" should be replaced with the word "counter"

Signed and Sealed this
Twenty-third Day of October, 2012

David J. Kappos
*Director of the United States Patent and Trademark Office*